United States Patent
Edwards

(10) Patent No.: US 8,321,718 B2
(45) Date of Patent: Nov. 27, 2012

(54) CLOCK CONTROL

(75) Inventor: David Alan Edwards, Bristol (GB)

(73) Assignee: Icera Inc., Wilmington, DE (US)

( * ) Notice: Subject to any disclaimer, the term of this patent is extended or adjusted under 35 U.S.C. 154(b) by 1037 days.

(21) Appl. No.: 12/275,375

(22) Filed: Nov. 21, 2008

(65) Prior Publication Data

US 2009/0138879 A1    May 28, 2009

(30) Foreign Application Priority Data

Nov. 22, 2007    (GB) .................................. 0722967.7

(51) Int. Cl.
*G06F 1/04* (2006.01)
(52) U.S. Cl. ....................................... 713/600
(58) Field of Classification Search .................... 713/600
See application file for complete search history.

(56) References Cited

U.S. PATENT DOCUMENTS

| | | |
|---|---|---|
| 2002/0087897 A1 | 7/2002 | Cline et al. |
| 2003/0028816 A1* | 2/2003 | Bacon ........................... 713/500 |
| 2003/0131268 A1 | 7/2003 | Kolinummi et al. |
| 2004/0025067 A1 | 2/2004 | Gary et al. |
| 2005/0138442 A1 | 6/2005 | Keller, Jr. et al. |
| 2006/0005051 A1 | 1/2006 | Golla et al. |

FOREIGN PATENT DOCUMENTS

| | | |
|---|---|---|
| GB | 2427724 | 1/2007 |
| GB | 0722967.7 | 3/2009 |
| JP | 200611697 | 1/2006 |
| WO | WO2006117562 | 11/2006 |

* cited by examiner

*Primary Examiner* — Paul R Myers
*Assistant Examiner* — Jeremy S Cerullo

(57) ABSTRACT

The present invention provides a processor comprising: an execution unit arranged to execute a plurality of program threads, clock generating means for generating first and second clock signals, and storage means for storing at least one thread-specific clock-control bit. The execution unit is configured to execute a first one of the threads in dependence on the first clock signal and to execute a second one of the threads in dependence on the second clock signal. The clock generating means is operable to generate the second clock signal with the second frequency selectively differing from the first frequency in dependence on the at least one clock-control bit. A corresponding method and computer program product are also provided.

25 Claims, 2 Drawing Sheets

CLOCK CONTROL

PRIORITY CLAIM

The present application claims the priority of Great Britain Patent Application No. 0722967.7 filed Nov. 22, 2007.

FIELD OF THE INVENTION

The present invention relates to controlling clock speed on a processor.

BACKGROUND OF THE INVENTION

Power management is an important aspect of processor design, especially as the designs of such processors become ever more complex and the demand for small, battery-powered consumer devices such as mobile phones increases. One way to control power consumption is to change the processor's clock speed, some general examples of which can be found in JP 2006-11697 (Nakamura), US 2003/0131268 (Kolinummi et al), US 2004/0025067 (Gary et al), and US 2002/0087897 (Cline et al).

For example, Kolinummi describes a programmable power control register containing information about powered down-modes for different hardware units, one of the hardware units being a CPU. The powered down mode may affect the clock frequency supplied to the hardware unit.

If a processor runs too fast, there may be wasted clock cycles and therefore wasted power (especially as running at high frequency requires a higher voltage than operating at lower frequencies). But on the other hand, sometimes a processor will need to run at full speed. It would be advantageous to provide a more flexible system for controlling a processor's clock speed.

SUMMARY

According to one aspect of the invention, there is provided processor comprising: an execution unit arranged to execute a plurality of program threads, each thread comprising a sequence of instructions; clock generating means for generating a first clock signal having a first frequency and a second clock signal having a second frequency; storage means operable to store at least one thread-specific clock-control bit for one of said threads; wherein the execution unit is configured to execute a first one of said threads in dependence on the first clock signal and to execute a second one of said threads in dependence on the second clock signal; and wherein the clock generating means is operable to generate the second clock signal with the second frequency selectively differing from the first frequency in dependence on the at least one clock-control bit.

Thus the present invention provides a mechanism for low-latency, fine-grained control of clock frequency on a per-thread basis. The control is thread-specific for multiple threads on the same device, i.e. so it affects different threads on the same device differently and advantageously does not require sharing state between threads.

So the invention provides the following advantages:
  the frequency is controlled on a per-thread basis to allow different threads to operate at different frequencies (thus allowing an optimal trade-off of performance/power as required by specified software code sequences);
  scheduling operations may maintain the frequency specified by each thread rather than inheriting the state from the previously scheduled thread;

In embodiments, the execution unit may be operable to execute real time operating system software for scheduling the threads, the scheduling including controlling the at least one clock-control bit.

Thus the invention may advantageously allow explicit software control of the thread specific clock speeds. Further, RTOS modifications may not be required and thus the technique will operate seamlessly with existing software.

In further embodiments, the storage means may comprise a status register, the processor being configured to load at least part of a first context into the status register when executing the first thread, and to load at least part of a second context into the status register in place of the first context when executing the second thread, each context defining a state of the respective thread including the respective clock control bit or bits.

Through the use of one or more thread specific bits in the status register, the control can be achieved by a mixture of low-latency explicit software actions and simple hardware implicit actions. Thus only short, simple sequences of instructions are required to control the processor's frequency, and a small amount of additional hardware is required to implement the mechanism.

In further embodiments, the processor may be configured to automatically alter at least one of the clock control bits upon detecting an interrupt.

Thus the invention may provide automatic control on interrupt launch, allowing immediate switching to the correct clock speed for a thread handling the interrupt rather than inheriting the speed from the previously scheduled thread. So the interrupt handler can run at a higher or full clock speed.

In further embodiments, the storage means may be operable to store at least one thread-specific clock control bit for each of said first and second threads; and the clock generating means may be operable to selectively alter the first and second clock signals in dependence on the clock control bits for the first and second threads respectively.

The clock generation means may comprise a clock divider operable to generate the second clock signal by selectively dividing another clock signal in dependence on the clock-control bit. The clock divider is preferably in the same clock domain as the execution unit.

The processor may comprise a clock controller register arranged to control a third frequency of a third clock signal from which the first and second clock signals are generated.

The processor may advantageously be embodied in an integrated circuit comprising: an RF interface configured to receive signals over a wireless cellular network; and a program memory arranged to supply instructions for execution by the execution unit, the instructions constituting one or more signal processing threads including said first thread for performing signal processing functions on said received signals and one or more other threads including said second thread for performing a function other than a signal processing on said received signals; wherein the memory may be arranged to supply instructions which, when executed by the execution unit, set said at least one clock-control bit such that instructions of the signal processing thread or threads will be executed at a higher frequency than instructions of the other thread or threads.

For example, the integrated circuit may comprise a peripheral interface, wherein the second thread may comprise instructions for handling interaction with a peripheral via the peripheral interface. The integrated circuit may comprise a memory controller, wherein the second thread may be for handling interaction with a memory via the memory controller. The second thread comprises instructions for polling at least one of the peripheral interface, the memory controller, and an on-chip register.

The inventor has recognised a particularly advantageous application of the present invention to an integrated circuit having an RF interface and a processor programmed to handle signal processing for wireless cellular communications. In such situations, the high burden signal processing functions may require a relatively large number of processing cycles per unit time, but other operations such as interaction with peripherals may typically occur at lower speeds and if too many cycles are allocated to such operations then those cycles could be wasted. Additionally, running at a high frequency may prevent automatic voltage control from being able to lower the voltage.

According to another aspect of the present invention, there is provided a method of controlling clock speed in a processor, the method comprising: scheduling a plurality of program threads for execution by an execution unit, each thread comprising a sequence of instructions; generating a first clock signal having first frequency; writing at least one thread-specific clock-control bit for one of said threads to a storage means; generating a second clock signal having a second frequency selectively differing from the first frequency in dependence on the clock-control bit; executing a first one of said threads in dependence on the first clock signal; and executing a second one of said threads in dependence on the second clock signal.

According to another aspect of the invention, there is provided a computer program product for controlling clock speed in a processor, the program comprising code which when executed by a processor performs the steps of: scheduling a plurality of program threads for execution by an execution unit, each thread comprising a sequence of instructions; writing at least one thread-specific clock-control bit for one of said threads to a storage means; executing a first one of said threads in dependence on the first clock signal having first frequency; and executing a second one of said threads in dependence on a second clock signal having a second frequency selectively differing from the first frequency in dependence on the clock-control bit.

For a better understanding of the present invention and to show how the same may be carried into effect, reference will now be made by way of example to the accompanying drawings.

DETAILED DESCRIPTION

Figure 1:
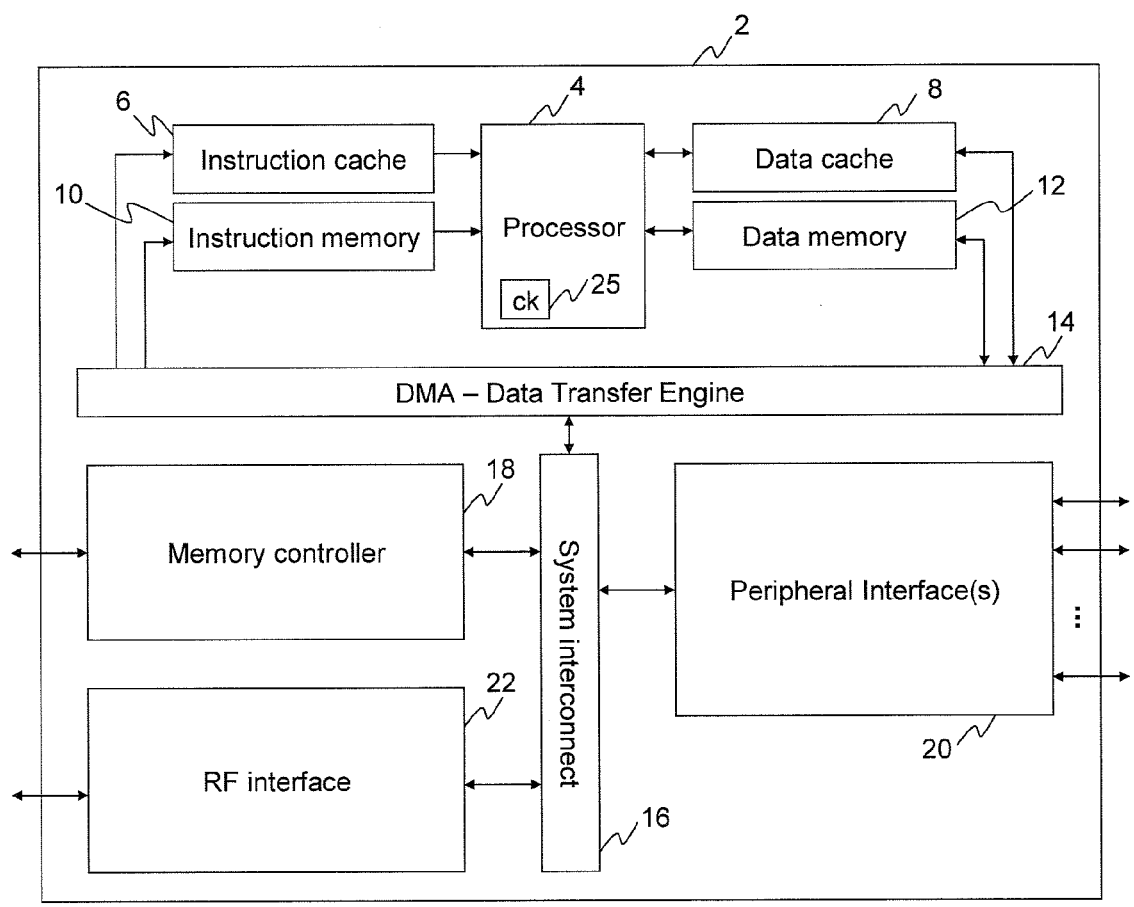
FIG. 1 is a schematic block diagram of a soft-modem.

Processors can run multiple software threads. This is achieved by scheduling the threads one at a time in a series or interleaved fashion through the same execution unit, using a real time operating system (RTOS) whereby the multiple software threads are scheduled onto the processor by operating system software.

Threads may interact with other threads on the same or different processors, and may also interact with external devices (e.g. DMA engines, serial ports etc.). Typically these external interactions are performed via slower frequency peripherals (e.g. uncached memory connecting two processors, or a serial links connecting several processors, or a memory mapped device connecting a processor and another device e.g. an Ethernet MAC). The slower frequency peripherals typically operate an order of magnitude slower than the processor itself. For example, a 1 GHz processor may interact with another external 1 GHz processor via a 166 MHz memory.

These interactions typically take the form of reads/writes of memory (where the memory is running much slower than the processor due it being external, or uncached, or simply a slow peripheral); and/or involve synchronization (achieved by busy-loops such as spinlocks and/or interrupts).

Thus the sequences of software instructions where the processor interacts with slow peripherals result in many "wasted" clock cycles whereby there is no need for the processor to operate at such a high frequency. Performing these sequences when operating at a lower clock frequency would:
a) not slow down the time taken for the sequence (as it is bound by the speed of the slow peripheral),
b) save power,
c) allow normal mechanism(s) for operating at a lower voltage to do so if appropriate,
d) result in less heat being dissipated (thus the system would operate at a lower temperature), and
e) potentially allow other accesses to operate more efficiently (e.g. if other processors or peripherals are using the same memory system or internal/external bus there will be less contention at lower frequencies due to reduced access frequencies).

Similarly, some aspects of software may not have hard real-time deadline(s) and so could be executed at a lower frequency thus saving power/heat.

Such facilities would also be of use in RTOS scheduling algorithms designed to cope with thermal effects, for example if a temperature sensor indicates that the processor has exceeded a specified temperature its frequency could be reduced for all but the crucial threads until such as time as the temperature has reduced.

Therefore it could be useful if software explicitly requested a slower speed when starting to execute such code sequences, e.g.:
goSlow( );
. . . code sequence not requiring full clock frequency
goFast( ); These sequences could be used when full frequency operation is not required (e.g. within spinlock routines, when reading memory areas known to be external/uncached and therefore very slow).

However, in order to achieve such goSlow( ) and goFast( ) functions, the software would need to interact with the hardware and software level components which control the frequency of the processor's clock. If this was attempted using a conventional processor, this would have to involve interacting with a CRPC (clock power reset controller) by writing to registers such that a specified clock frequency is selected. However, the inventor has recognised the following problems with such an approach.

Firstly, writing to the CRPC explicitly sets an absolute frequency for the whole processor, rather than for the specified thread currently executing. Thus it affects all threads, not just the thread(s) which request a lower frequency. It may also involve having to perform read/modify/write operations to modify specific fields of CRPC registers (as other software threads may be writing to other fields in the same register). Thus it requires yet more software synchronization to ensure that the registers are accessed correctly.

Secondly, occurrence of an interrupt during the "code sequence not requiring full clock frequency" results in the interrupt handler routine executing at the reduced frequency and thus taking longer to execute than necessary, and also adversely affecting interrupt latency which may result in functional failures of the hardware/software system. This could be avoided by making the interrupt handler explicitly save/modify/restore the state of the CRPC but doing so would require extra instructions, extra memory/register state and consumes processor cycles/power to execute these instructions which would affect all context switching operations.

Thirdly, a RTOS scheduling a different thread (due to a timer interrupt, or a system call or some other means) would result in the other thread executing at the lower clock frequency rather than the full frequency it normally uses. This could result in functional failure of the system.

These problems could perhaps be avoided by making the context switch routines explicitly save/modify/restore the state of the CRPC. But doing so would require extra instructions and extra memory/register states, and would consume processor cycles/power to execute these instructions which would affect all context switching operations.

Thus the overhead and problems associated with allowing software to perform fine-grain explicit clock setting using conventional techniques would render it impractical. Indeed, no such attempts at thread-specific clock control have previously been made.

FIG. 1 schematically illustrates an example integrated circuit 2 in which the present invention may be embodied. The circuit 2 comprises a processor core 4 to which are connected an instruction memory 10, a data memory 12, an instruction cache 6, and a data cache 8. Each of the instruction memory 10, data memory 12, instruction cache 6 and data cache 8 are connected to a direct memory access (DMA) data transfer engine 14, which in turn is connected to a system interconnect 16. (In fact, there are preferably provided two DMA data transfer engines, but only one is shown for simplicity). The processor 4 comprises a clock 25.

The system interconnect 16 connects between the DMA data transfer engine 14 and various "system on chip" components, examples of which are illustrated here in a simplified, schematic manner. Accordingly, the system interconnect 16 is connected to a memory controller 18, one or more peripheral interfaces 20, and an analogue radio frequency (RF) interface 22. The memory controller 18 connects to one or more external memory devices (not shown), i.e. external to the integrated circuit 2. For example, the memory controller 18 may support a connection to RAM such as SDRAM or mobile DDR, to flash memory such as NAND flash or NOR flash, and/or to a secure ROM. Each of the one or more peripheral interfaces 20 connects to a respective external peripheral (also not shown). In the case where there are a plurality of peripheral interfaces 20, these may be connected to the system interconnect 16 by a peripheral bus (also not shown). For example, the peripheral interfaces may comprise a USIM interface, a power management interface, a UART interface, a serial interface, and/or a general purpose I/O interface. The RF interface 22 connects with an RF front-end and antenna (also not shown), and ultimately with a wireless cellular network over an air interface.

In a preferred embodiment, the chip used is designed by Icera and sold under the trade name Livanto®. Such a chip has a specialised processor platform described for example in WO2006/117562.

The processor 4 is configured to perform software multi-threading whereby a plurality of software threads are scheduled in a series or interleaved manner for execution through the same execution unit. Each thread comprises a sequence of instructions, along with a corresponding state preferably stored as a set of register values. In the example below only two threads A and B are discussed below for simplicity, but it will be understood that the invention can apply to any number of threads.

In operation, the instructions of whichever thread A or B is currently scheduled by the RTOS are first fetched into the processor 4, either directly from the instruction memory 10 or from an external memory via the memory controller 18, data transfer engine 14 and instruction cache 6. The method by which this is determined is based upon the upper bits of the address, which specify whether it's a cached external address (i.e. held externally and fed thru the cache) or an internal uncached address (i.e. instruction memory). The instructions are then executed by the processor 4 in dependence on the processor clock 25. Data to be operated on by the instructions of the threads may be retrieved by the processor 4 from the data cache 8, data memory 12 or on-chip peripheral(s) whose registers/buffers appear as internal memory mapped addresses. Data output by the instructions of the threads may be written by the processor 4 to the data cache 8 or data memory 12.

In a preferred application of the present invention, the integrated circuit 2 is configured as a software modem, or "soft modem", for handling wireless communications with a wireless cellular network. The principle behind software modem is to perform a significant portion of the signal processing required for the wireless communications in a generic, programmable, reconfigurable processor, rather than in dedicated hardware.

Preferably, the software modem is a soft baseband modem. That is, on the receive side, all the radio functionality from receiving RF signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored in the instruction memory 10, data memory 12 and external memory, and executed by the processor 4.

In a preferred implementation, the dedicated hardware in the receive part of the RF interface 22 may comprise a low noise amplifier (LNA), mixers for downconversion of the received RF signals to intermediate frequency (IF) and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the RF interface 22 may comprise a digital to analogue conversion (DAC) stage, mixers for upconversion of the baseband signals to IF and for upconversion from IF to RF, RF and IF filter stages, and a power amplifier (PA). Details of the required hardware for performing such radio functions will be known to a person skilled in the art.

Received data is passed from the RF interface 22 to the processor 4 for signal processing, via the system interconnect 16, DMA data transfer engine 14 and data memory 12. Data to be transmitted is passed from the processor 4 to the RF interface 22 via the data memory 12, DMA data transfer engine 14 and system interconnect 16.

The software modem, implemented by threads running on the processor 4, may then handle functions such as:
  Modulation and demodulation,
  Interleaving and de-interleaving,
  Rate matching and de-matching,
  Modulation and demodulation,
  Channel estimation,
  Equalisation, Rake processing,
Bit log-likelihood ratio (LLR) calculation,
Transmit diversity processing,
Receive diversity processing,
Multiple-Input Multiple-Output (MIMO) processing,
Voice codecs,
Link adaptation by power control or adaptive modulation and coding, and/or
Cell measurements.

The threads running on the processor 4 may also interact with one or more external memories via the memory controller 18, system interconnect 16 and DMA data transfer engine 14. The threads may also interact with one or more external peripherals via the peripheral interface or interfaces 20, system interconnect 16 and DMA data transfer engine 14. The threads may also potentially interact with other system-on-chip components not discussed here. Further, the threads may interact with each another.

Such interactions may take the form of polling. Some small code sequences or whole threads may not need to run at the full speed of the processor clock 25, for example sequences or threads for polling on-chip registers, peripherals, another processor or external uncached memory (which is typically hundreds of times slower than cached memory). Running such threads more slowly would avoid pointless iterations in such loops and thus would save power. Other threads may not need to run at full speed because the component or device with which they are interacting is clocked at a lower speed, e.g. a thread running on the processor 4 may interact with another external processor via a memory clocked at a speed an order of magnitude slower than the processor clock 25. Or a thread may interact with a peripheral which is clocked at a lower speed (e.g. UART/I2C), or via a peripheral interface or peripheral bus which is clocked at a lower speed. Other threads may not need to run at full speed simply because the function they perform is not very complex and therefore not very burdensome in terms of processor cycles, e.g. hand-over to 2G call at 150 MHz, or running protocol stack threads at 100 MHz. Again, running such threads slowly will save power.

Some other threads would preferably run at a higher or full clock speed. In a preferred application of the present invention, such threads include threads for performing signal processing functions of the soft modem on signals received via the RF interface 22 from a wireless cellular network, e.g. 3.6 MBits HSDPA signal processing at 700 MHz and/or 1.8 MBits/sec HSDPA signal processing at 500 MHz. Other high speed threads could include compute intensive or latency-sensitive threads.

However, if it was attempted to schedule threads of different speeds using a conventional processor, this would have to involve saving and loading the CRPC state for the different threads. For reasons discussed above, this would be slow and impractical.

Further, some other interactions take the form of interrupts which must be acted upon quickly to ensure a rapid reaction time to stimulus. These could include for example interrupts from peripherals or from another thread. Such fast reaction time would be hindered if the thread handling the interrupt was required to run at a fast clock speed, but upon occurrence of the interrupt it inherited the slower clock speed from the previous thread. Again, saving and loading the state of the CPRC for the different threads would be slow and impractical.

So to provide thread-specific clock control, a new mechanism is required.

Figure 2:
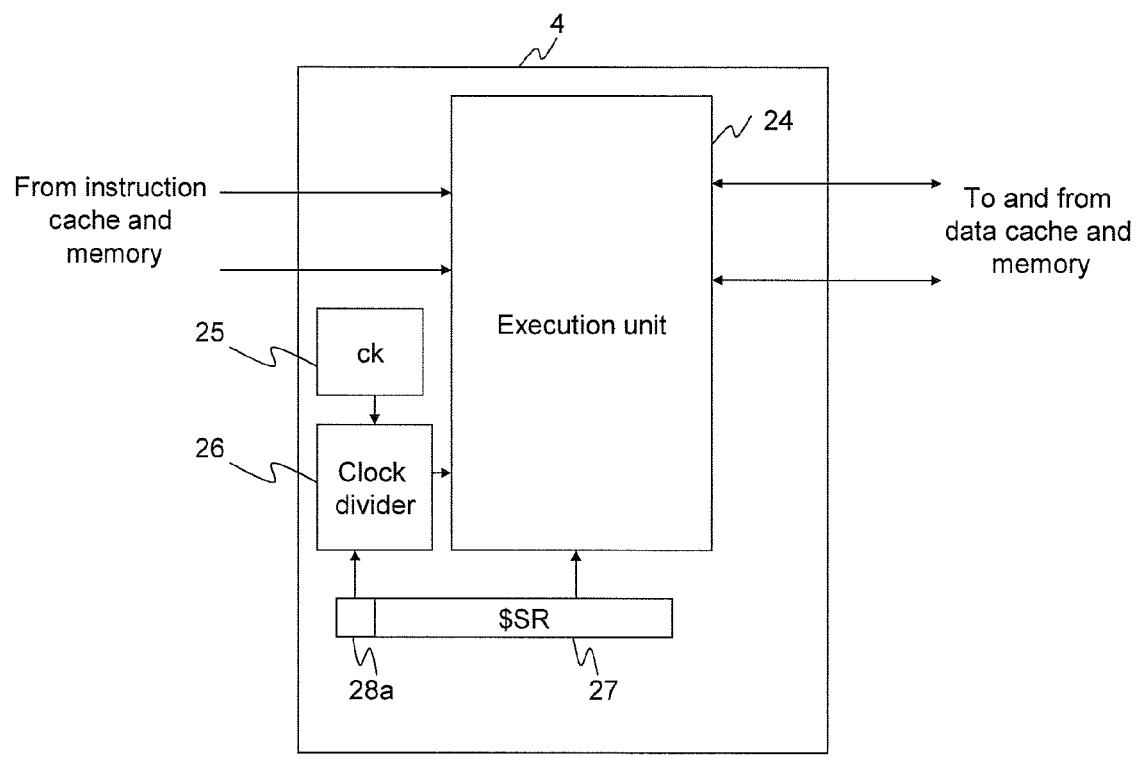
FIG. 2 is a schematic block diagram of a processor for clock control.

FIG. 2 is a schematic representation of the processor 4 equipped with an example of such a mechanism. The processor comprises an execution unit 24 connected to the instruction cache 6, the instruction memory 10, the data cache 8 and the data memory 12. The execution unit 24 comprises an execution pipeline having a fetch stage for fetching instructions from the instruction cache 6 and instruction memory 10 as appropriate, and a read/write stage for retrieving and writing data to the data cache 8 and data memory 12. The threads are scheduled by the RTOS for execution in an interleaved or series fashion through the same pipeline of the same execution unit.

The processor 4 further comprises the processor clock 25, a clock divider 26, and a status register ($SR) 27 having at least a clock control portion 28. The clock divider 26 has a clock input connected to the output of processor clock 25, a control input connected to the clock control portion 28 of the status register 27, and a clock output connected to the clock input of the execution unit 24. The execution unit 24 is also connected to other portions of the status register 27.

In operation, the clock 25 outputs a first clock signal to the clock divider 26, the first clock signal having a clock speed (frequency) determined by the CPRC register state.

Each software thread (e.g. A and B) has its own respective "context" which defines the respective state of that thread, such as whether interrupts are enabled or disabled, whether debug features are enabled, and arithmetic state (e.g. condition codes etc.). When the RTOS schedules a thread for execution, say thread A, it loads information regarding the state of thread A into the status register ($SR) 27 (as well as into other registers such as general purpose registers and a program counter—the $SR may only be part of the thread's context). The execution unit 24 then executes the instructions of thread A in dependence on the contents of the status register 27 (and other registers). When the RTOS subsequently schedules another thread, say thread B, it then saves the context of thread A to memory (or to yet further registers) and loads the context of thread B into the status register 27 and the other registers used for the context (overwriting thread A's context which is now saved elsewhere). The execution unit 24 will then execute the instructions of thread B in dependence on the new contents of the status register 27 (and other registers). So the status register 27 switches between storing either part of the first thread A's context or part of the second thread B's context (but not both) at any one time.

In embodiments of the invention, the status register 27 is provided with an additional clock control portion 28 comprising one or more clock control bits, or "go slow" bits. These are dedicated bits for use in controlling the speed of the clock signal supplied from the clock divider 26 to the execution unit 4. Accordingly, the context of each thread includes a respective clock speed requirement defined by respective clock control bits.

The clock divider 26 is arranged to selectively divide the first clock signal in dependence on the clock control bit(s) 28. So when the context for thread A is loaded into the status register 27 (and other registers) this will include loading thread A's clock control bits into the clock control portion 28, and when the context for thread B is loaded into the status register 27 (and other registers) this will include loading thread B's clock control bits into the clock control portion 28. The (potentially) divided signal is then output as a second clock signal to the execution unit 24, which is configured to fetch and execute the instructions in dependence on that second clock frequency. Thus when the first thread A is scheduled it is automatically executed at the desired thread-specific speed, and if the scheduling is switched to the second thread B then execution can automatically switch to a different speed as appropriate to thread B without needing to save or load the CPRC state.

The clock down divider 26 is preferably located close to the processor 4 in order to provide fine-grained and low-latency changes. That is, the clock path is short enough such that changes in the divider's output clock signal act quickly on the processor. The divider 26 and execution unit 24 are preferably in the same clock domain, i.e. the clock path from the divider 26 to the execution unit 24 is preferably less than one clock cycle of the clock signal output by the divider.

The clock control portions 28 of the status register 27 could include only a single clock control bit for switching the respective thread between the full speed (i.e. the same speed as the processor clock 25) and a lower speed. Alternatively, it could comprise more than one clock control bit to allow a finer degree of control between maximum and minimum speed.

In a particularly advantageous application, the processor 4 is arranged to receive interrupts, for example from peripherals via the peripheral interface(s) 20. On detecting the interrupt, the RTOS schedules a thread for handling that interrupt, the scheduling including loading that thread's context into the status register 27 and other registers (if that thread is not already scheduled). The interrupt handling thread's context should preferably specify a full clock speed, which will be automatically loaded into the status register on occurrence of the interrupt. Thus the processor 4 will implicitly reset the go-slow bit(s) on an interrupt raise in order to allow the interrupt handler or handlers to run at full speed, improving the reaction time of the system to stimulus.

Interrupt logic (not shown) may also be provided on the chip 2 to automatically alter the go-slow-bit(s) if the relevant thread's context does not already specify the full or best speed for handling the interrupt. This could include chip-level interrupt clock-control bit(s) (not shown) which are written to the go-slow bit(s) 27 of the register 28 upon interrupt launch, rather than simply resetting the go-slow bit(s) 27 to zero.

The process of reading and writing to the status register 28 is now described in more detail. As mentioned, multi-thread processors have a status register 28 ($SR) to denote thread-specific state such as whether interrupts are enabled or disabled, whether debug features are enabled, arithmetic state (e.g. condition codes etc.). This is part of the normal software thread context and so is saved/restored by normal RTOS scheduling operations. Instructions are normally available to permit low-latency access to this register (to read it, to write it, and to atomically set or clear specified bits). For example:
get $cDst, $SR
//reads the value of $SR into the general purpose register $cDst
put $SR, $cSrc
//writes the value in the general purpose register $cSrc into $SR.
setsr <bitmask>
//$SR:=$SR ORed with the specified bitmask value (i.e. bitmask specifies which bits to set to 0b1).
clrslr <bitmask>
//$SR:=$SR ANDed with the inverse of the specified bitmask value (i.e. bitmask specifies which bits to clear to 0b0).

To achieve the thread-specific clock control, additional bits are added to the status register to determine whether to operate at full frequency (as set by the CRPC) or whether to operate at a lower frequency. These bits are referred to as "GOSLOW".

The GOSLOW bits have the effect of specifying the processor's clock frequency. This can be achieved by using them to specify a programmable division of the clock generated by the CRPC (or alternatively could be used to directly control the clock the CRPC generates according to control signals from the processor).

At least 1-bit should be provided e.g.:
0b0=operate at full frequency
0b1=operate at slower frequency X Alternatively a multi-bit field would provide a richer set of options:
0b00=operate at full frequency
0b01=operate at slower frequency X
0b10=operate at slower frequency Y
0b11=operate at slower frequency Z Where slower frequency X, Y and Z could either be fixed frequencies (e.g. ¼, ⅛, 1/16 etc.) or could be programmed by some other means (e.g. other registers are used to specify their values).

The normal get/put/setsr/clrsr instructions are able to read/write/modify the GOSLOW bits.

For example the normal RTOS code uses getsr/putsr to save/restore the value of $SR when performing a context switch operation. This implicitly saves/restores the GOSLOW bits without requiring any modifications to the RTOS code.

E.g. if a 1-bit GOSLOW field is provided at bit 2 of SR the <goslow>/<gofast> routines described on page are single instructions:
goSlow( )=setsr 0x4
goFast( )=clrsr 0x4

When hardware launches an interrupt handler it typically saves $SR in another register (e.g. $SSR the saved status register, or perhaps in a memory location) and then modifies some bits of $SR. e.g. the interrupt enable bit ($SR.IE) is typically cleared to 0b0.

Launching an interrupt will also clear $SR.GOSLOW to 0 thus restoring the processor to full frequency operation. Thus interrupt handlers will execute at full frequency, when the interrupt handler returns it will restore the $SR register (from $SSR or perhaps a memory location) as normal and thus re-select the frequency specified by the thread's GOSLOW bits.

It will be appreciated that the above embodiments are described only by way of example. In other examples, the processor may handle any number of threads, and/or thread-specific clock control bits may be provided for only one or some of the threads. Further, although the above has been described in terms of switching thread's contexts, alternatively the clock divider could be connected to a register simultaneously holding thread-specific clock-division bits for a plurality of threads. Further, instead of dividing the processor clock signal, it could be altered by other relationships. Further, while the above is the preferred implementation, solutions where the RF/IF stage is not implemented by dedicated hardware are also envisaged. Further, the invention may have other applications than in wireless signal processing or soft modems. Other configurations and uses will be apparent to the person skilled in the art. The scope of the invention is not limited by the described embodiments, but only be the following claims.

The invention claimed is:

1. A processor comprising:
   an execution unit arranged to execute a plurality of program threads, each thread comprising a sequence of instructions;
   clock generating means for generating a first clock signal having a first frequency and a second clock signal having a second frequency;

storage means operable to store at least one thread-specific clock-control bit for one of said threads;

wherein the execution unit is configured to execute a first one of said threads in dependence on the first clock signal and to execute a second one of said threads in dependence on the second clock signal; and wherein the clock generating means is operable to generate the second clock signal with the second frequency selectively differing from the first frequency in dependence on the at least one clock-control bit.

2. The processor according to claim 1, wherein the execution unit is operable to execute real time operating system software for scheduling the threads, the scheduling including controlling the at least one clock-control bit.

3. The processor according to claim 1, wherein:

the storage means is operable to store at least one thread-specific clock control bit for each of said first and second threads; and the clock generating means is operable to selectively alter the first and second clock signals in dependence on the clock control bits for the first and second threads respectively.

4. The processor according to claim 3, wherein the storage means comprises a status register, the processor being configured to load at least part of a first context into the status register when executing the first thread, and to load at least part of a second context into the status register in place of the first context when executing the second thread, each context defining a state of the respective thread including the respective clock control bit or bits.

5. The processor according to claim 3, wherein the processor is configured to automatically alter at least one of the clock control bits upon detecting an interrupt.

6. The processor according to claim 1, wherein the clock generation means comprises a clock divider operable to generate the second clock signal by selectively dividing another clock signal in dependence on the clock-control bit.

7. The processor according to claim 6, wherein the clock divider is in the same clock domain as the execution unit.

8. The processor according to claim 1, comprising a clock controller register arranged to control a third frequency of a third clock signal from which the first and second clock signals are generated.

9. An integrated circuit comprising:

a processor according to claim 1;

an RF interface configured to receive signals over a wireless cellular network; and a program memory arranged to supply instructions for execution by the execution unit, the instructions constituting one or more signal processing threads including said first thread for performing signal processing functions on said received signals and one or more other threads including said second thread for performing a function other than a signal processing on said received signals;

wherein the memory is arranged to supply instructions which, when executed by the execution unit, set said at least one clock-control bit such that instructions of the signal processing thread or threads will be executed at a higher frequency than instructions of the other thread or threads.

10. The integrated circuit according to claim 9, comprising a peripheral interface, wherein the second thread comprises instructions for handling interaction with a peripheral via the peripheral interface.

11. The integrated circuit according to claim 9, comprising a memory controller, wherein the second thread is for handling interaction with a memory via the memory controller.

12. The integrated circuit according to claim 9, wherein the second thread comprises instructions for polling at least one of the peripheral interface, the memory controller, and an on-chip register.

13. A method of controlling clock speed in a processor, the method comprising:

scheduling a plurality of program threads for execution by an execution unit, each thread comprising a sequence of instructions;

generating a first clock signal having a first frequency;

writing at least one thread-specific clock-control bit for one of said threads to a storage means;

generating a second clock signal having a second frequency selectively differing from the first frequency in dependence on the clock-control bit; executing a first one of said threads in dependence on the first clock signal; and executing a second one of said threads in dependence on the second clock signal.

14. The method according to claim 13, wherein said scheduling comprises executing a real time operating system software for scheduling the threads, the scheduling including controlling the at least one clock-control bit.

15. The method according to claim 13, comprising:

writing at least one thread-specific clock control bit for each of said first and second threads; and selectively altering the first and second clock signals in dependence on the clock control bits for the first and second threads respectively.

16. The method according to claim 15, comprising loading at least part of a first context into a status register when executing the first thread, and loading at least part of a second context into the status register in place of the first context when executing the second thread, each context defining a state of the respective thread including the respective clock control bit or bits.

17. The method according to claim 15, comprising altering at least one of the clock control bits upon detecting an interrupt.

18. The method according to claim 13, wherein the generation of the second clock signal comprises selectively dividing another clock signal in dependence on the clock-control bit.

19. The method according to claim 18, wherein said division is performed in the same clock domain as said execution of the first and second threads.

20. The method according to claim 13, comprising controlling a third frequency of a third clock signal, from which the first and second clock signals are generated, in dependence on a clock controller register.

21. The method according to claim 13, comprising receiving signals over a wireless cellular network;

wherein the executing of said first and second threads comprises executing one or more signal processing threads including said first thread for performing signal processing functions on said received signals and one or more other threads including said second thread for performing a function other than a signal processing on said received signals; and said writing comprises setting said at least one clock-control bit such that instructions of the signal processing thread or threads will be executed at a higher frequency than instructions of the other thread or threads.

22. The method according to claim 21, wherein the second thread comprises instructions for handling interaction with a peripheral via a peripheral interface.

23. The method according to claim 21, wherein the second thread is for handling interaction with a memory.

24. The method according to claim 21, wherein the second thread comprises instructions for polling at least one of the peripheral interface, the memory controller, and an on-chip register.

25. A computer program product for controlling clock speed in a processor, the program comprising code stored on a non-transitory computer readable medium which when executed by a processor performs the steps of:

scheduling a plurality of program threads for execution by an execution unit, each thread comprising a sequence of instructions;

writing at least one thread-specific clock-control bit for one of said threads to a storage means;

executing a first one of said threads in dependence on a first clock signal having first frequency; and executing a second one of said threads in dependence on a second clock signal having a second frequency selectively differing from the first frequency in dependence on the clock-control bit.

* * * * *